US011242089B2

(12) United States Patent
Wirsing et al.

(10) Patent No.: US 11,242,089 B2
(45) Date of Patent: Feb. 8, 2022

(54) CHASSIS FOR A PASSENGER CAR (71) Applicant: Daimler AG, Stuttgart (DE)

(72) Inventors: Michael Wirsing, Gechingen (DE);
Matthias Hildebrand, Dagersheim
(DE); Andreas Freund, Wildberg (DE);
Peter Gere, Owen (DE); Levent
Aktay, Leinfelden-Echterdingen (DE);
Jan-Mark Opelka, Remshalden (DE);
Peter Kuemmerlen, Stuttgart (DE);
Dietmar Kallfass, Ammerbuch (DE);
Jens Spremberg, Suessen (DE); Joerg
Zimmermann, Calw (DE); Dieter
Edele, Stuttgart (DE); Steffen
Dingfelder, Sindelfingen (DE); Ralf
Mehrholz, Leonberg (DE); Marcus
Hirzel, Stuttgart (DE); Bianca Oehm,
Stuttgart (DE); Marie-Louise
Hertfelder, Steinenbronn (DE)

(73) Assignee: Daimler AG, Stuttgart (DE)

( * ) Notice: Subject to any disclaimer, the term of this patent is extended or adjusted under 35 U.S.C. 154(b) by 240 days.

(21) Appl. No.: 16/328,585

(22) PCT Filed: Aug. 24, 2017

(86) PCT No.: PCT/EP2017/001009
§ 371 (c)(1),
(2) Date: Feb. 26, 2019

(87) PCT Pub. No.: WO2018/041396
PCT Pub. Date: Mar. 8, 2018

(65) Prior Publication Data
US 2021/0284241 A1 Sep. 16, 2021

(30) Foreign Application Priority Data
Aug. 27, 2016 (DE) .................... 10 2016 010 353.1

(51) Int. Cl.
B62D 21/15 (2006.01)
B60K 1/04 (2019.01)
B62D 25/20 (2006.01)

(52) U.S. Cl.
CPC .............. *B62D 21/152* (2013.01); *B60K 1/04* (2013.01); *B62D 25/2027* (2013.01); *B60K 2001/0416* (2013.01); *B60Y 2306/01* (2013.01)

(58) Field of Classification Search
CPC ........ B60K 1/04; B62D 21/15; B62D 21/152; B62D 25/08; B62D 25/087; B62D 25/2027; B62D 43/00
(Continued)

(56) References Cited

U.S. PATENT DOCUMENTS 6,206,461 B1  3/2001 Gaiser
9,168,883 B1 10/2015 Midoun et al.
(Continued)

FOREIGN PATENT DOCUMENTS

CN   101209716 A   7/2008
CN   101837804 A   9/2010
(Continued)

OTHER PUBLICATIONS

English translation of DE 10 2013 005 571; retrieved Jun. 23, 2021 via PatentTranslate located at www.epo.org. (Year: 2021).*
(Continued)

Primary Examiner — Jason S Daniels
(74) Attorney, Agent, or Firm — Crowell & Moring LLP (57) ABSTRACT A chassis for a passenger car includes two main longitudinal chassis beams which are connected to one another via a bumper cross member. A support arrangement extends between the two beams and is supported on a central tunnel. The support arrangement forms a load path in an event of a collision-related force being applied to the passenger car
(Continued)

where above and/or below the support arrangement an installation space region is provided for accommodating a component or unit in need of protection. The support arrangement includes a strut which extends in a region of a center of the passenger car between the two beams and which forms a protective device which transmits impact forces forwards to the central tunnel. The strut has a first longitudinal section that is deformable in a targeted energy-absorbing manner and a second longitudinal section which functions as a rigid beam.

7 Claims, 6 Drawing Sheets

(58) Field of Classification Search
USPC .................................. 296/187.03, 187.11
See application file for complete search history.

(56) References Cited

U.S. PATENT DOCUMENTS

| 2007/0114815 | A1* | 5/2007 | Egawa ................. B62D 25/087 296/203.04 |
| 2008/0252104 | A1 | 10/2008 | Yamaguchi et al. |
| 2009/0001767 | A1 | 1/2009 | Yamaguchi et al. |
| 2009/0026802 | A1* | 1/2009 | Imada .................. B62D 21/152 296/187.11 |
| 2013/0249243 | A1* | 9/2013 | Lee ...................... B62D 25/082 296/187.03 |
| 2017/0217296 | A1* | 8/2017 | Nomura ................. B60R 19/02 |

FOREIGN PATENT DOCUMENTS

| CN | 105383561 A | 3/2016 |
| CN | 105539589 A | 5/2016 |
| CN | 205381313 U | 7/2016 |
| DE | 10 2013 005 571 A1 | 10/2014 |
| EP | 0 968 904 A2 | 1/2000 |
| JP | 2008-230460 A | 10/2008 |
| JP | 2010-195257 A | 9/2010 |
| JP | 2010-241393 A | 10/2010 |

OTHER PUBLICATIONS

Chinese Office Action issued in Chinese application No. 201780052423.X dated Dec. 9, 2020, with partial English translation (Eleven (11) pages).
PCT/EP2017/001009, International Search Report dated Dec. 22, 2017 (Two (2) pages).

* cited by examiner

CHASSIS FOR A PASSENGER CAR

BACKGROUND AND SUMMARY OF THE INVENTION

The invention relates to a chassis for a passenger car.

For example, if high-voltage batteries are carried in passenger cars for the vehicle's electric drives, but also in other areas of application, appropriate protection of the respective installation space or components within the passenger car chassis is of great importance. Especially with such high-voltage batteries, there is a risk of considerable damage and associated adverse effects, such as thermal or toxic hazards, if the passenger car crashes.

Various measures are already known to prevent such damage to high-voltage batteries. It is already known, for example, that such energy storage devices can be armored accordingly or rather placed outside the main deformation zone. However, in most cases this requires the use of smaller energy storage devices, which in turn can provide energy for a shorter range for the vehicle, or rather a shortage of usable space for the batteries.

A passenger car arises from the generic EP 0 968 904 A2, in which a support arrangement is provided in the rear area between lateral main longitudinal chassis beams, which support arrangement, in the event of a rear impact, forms an additional load path in the vehicle longitudinal direction forwards to a cross member connected to the main longitudinal chassis beams, so that, in the event of an offset rear impact initially acting on only one main longitudinal chassis beam, the impact forces are also transmitted to the other main longitudinal chassis beam and are partially absorbed by the support arrangement. This support arrangement results in a reduced but continuous deformation of the rear area of the passenger car, so that a sufficient foot space is preserved in the case of a third row of seats.

From the JP 2010 241393 A emerges a generic chassis for a passenger car.

It is an object of the invention to create a chassis of the type mentioned here, in which the space within the passenger car chassis, for example to accommodate a high-voltage battery, is protected in a particularly simple way.

The chassis according to the invention has two main longitudinal chassis beams extending into a rear section of the vehicle, which are connected to one another by at least one bumper cross member, and a supporting arrangement extending between the two main longitudinal chassis beam, which supporting arrangement is supported on a central tunnel provided in a protection zone S of the passenger car chassis during a collision-related application of force to form an additional load path L. The main longitudinal chassis beams are connected to one another by at least one bumper cross member, and the supporting arrangement is supported on a central tunnel provided in a protection zone S of the passenger car chassis according to the invention. Above and/or below the supporting arrangement is provided a construction space region for accommodating at least one component or unit in need of protection, wherein the supporting arrangement comprises a strut extending in the region of the vehicle center between the main longitudinal chassis beams, which strut is constructed as a protective device which passes the impact forces forwards to the central tunnel through or on to the central tunnel in the event of a force being applied as a result of a collision. In accordance with the invention, it is provided that the strut has a first longitudinal section which can be deformed in a targeted energy-absorbing manner in the event of an impact of a collision partner and a second longitudinal section which behaves as a rigid beam in the event of an impact of a collision partner and transmits the impact forces through or on.

By means of the support arrangement, such a support is created at the protective zone behind the vehicle center that an additional load path is provided between an outer support element arranged at an outer end of the deformation zone, for example a corresponding bending cross member or the like. This support results in a significant relief of the respective main longitudinal chassis beams of the passenger car chassis, in particular in the area of the deformation zone and also in the area of the protection zone, and thus in a preservation of the structural integrity of the passenger car chassis in this area by targeted deformation in the main deformation area, namely in the area of the deformation zone, whereby increased occupant protection can also be ensured.

It should be noted that the strut according to the invention has a longitudinal section that acts quasi as an energy absorption element, also known as a crash box. This is preferably formed or provided at one end of the strut, preferably at the strut end facing the collision partner. However, it is also conceivable that this first longitudinal section is also formed or arranged in a middle longitudinal section of the strut. This first longitudinal section deforms by exceeding introduced collision-related impact forces and shortening its length, whereby the deformation of this longitudinal section is controlled by appropriate measures, for example by means of targeted weakening, for example beads, differences in material thickness, openings and the like. The energy absorption of the body in the event of a rear-end collision is thus significantly improved once again, which also reduces the loads acting on the occupants within the protection zone, which also includes a passenger cell. The rigid, second longitudinal section withstands the impact forces as invented and therefore does not collapse.

In the event of a rear-end collision, the measures, according to the invention do not evenly and continuously reduce the energy-absorbing impact forces introduced by the chassis, but by means of the support arrangement at least the vehicle length range in which the installation space area to be protected is located as bridged, so that here no component or unit possibly damaging deformation takes place in this installation space area. By means of the support arrangement, according to the invention, the structural integrity of the chassis in the area or longitudinal direction of the vehicle is also ensured at the level of this installation space area and also within the protection zone. The creation of an additional load path results in a significant reduction of the loads on this special installation space within the passenger car chassis, which can, for example, be used to accommodate a high-voltage battery and which is located above or additionally or alternatively below the additional central load path created by the support arrangement. However, it is clear that instead of housing a high-voltage battery, this space can also be used for other components or aggregates, such as corresponding fuel tanks or the like. In addition, other components or units requiring special protection can also be reliably protected by this protective device. In general, the installation area to be protected is not a room closed on all sides or a chamber or the like, but merely a place or area for accommodating or arranging the component or unit to be protected.

A further advantage of the invention is that, for example, a corner type, i.e., a simple shape of the passenger car chassis without this supporting arrangement, can be produced and then easily supplemented by the supporting arrangement according to the invention, in order to provide special protection for corresponding installation spaces within the passenger car chassis. This special usability or retrofit ability of the support arrangement thus makes it possible to create a corner type of the chassis that is optimized in terms of cost and weight.

Basically, it is possible that the strut is designed in one piece. It is also possible for this strut to be composed of at least two individual parts, each of which preferably forms one of the two longitudinal sections.

A design example of the chassis is also preferred, in which at least the first longitudinal section of the strut is arranged in the area of a deformation zone. Deformation zone is the area of the chassis structure on the rear side of the car which is intended for crash-related energy absorption or in the area of which this deformation is to be located.

Furthermore, a design example of the chassis is given, in which the support arrangement and, in the region of the protection zone, a plate element and/or at least one strut, which is/are of such a rigid and stiff design that it withstands the impact forces in the event of a force being applied as a result of a collision and passes these on to the center tunnel, are comprised of the support arrangement and, in the region of the protection zone, a strut. In this part of the additional load path, the collision forces are also bridged to avoid deformation in this area, also above and below the load path.

After further development, it is provided that the supporting arrangement comprises at least substantially in the area of the deformation zone a supporting element and in the region of the protective zone a plate element and/or at least one strut, preferably a plurality of struts which are arranged at a distance from one another, optionally in the transverse direction of the motor vehicle. The corresponding design of the support arrangement in the area of the deformation zone or in the area of the protection zone allows the force transmission and deformation behavior of the support arrangement to be adjusted in the event of an accidental force transmission.

A further advantageous embodiment provides that the support arrangement has respective force introduction elements via which an accident force can be introduced into a rear floor under-floor rear seat, into a cross member and/or into the central tunnel provided in the region of a main floor. The respective force introduction elements thus enable optimum force introduction into the center tunnel of the passenger car chassis.

To solve the problem, a chassis with another characteristic is also provided. It is characterized by the fact that a U-shaped support element is provided which extends in the region of a rear structural element at the outer end of the deformation zone and in the region of the respective main longitudinal chassis beams and—viewed in the longitudinal direction of the vehicle—is arranged at least in sections in overlap with the installation space region arranged above the load path for receiving the at least one component or unit requiring protection. This stirrup-shaped support element is preferably rigid and stiff in order to avoid an intrusion or an intrusion at the level of the installation space to be protected which could possibly damage the component or unit to be protected. The support element, which is located inside the chassis or integrated into it and cannot be seen from the outside, has the function of impact protection in the event of a rear-end collision—preferably analogous to a frontal protection system also known as a cow catcher.

After further development of the chassis, it is intended that the U-shaped support element has a transverse element arranged at height and in overlap with the installation space area and legs running in the area of the main longitudinal chassis beams and connected to the respective main longitudinal chassis beams. This way of connecting the support element to the rest of the chassis ensures that the impact forces acting on the support element are also transferred to the main longitudinal chassis beams during rear impact. Therefore, complex, additional support structures for connecting the U-shaped support element can be dispensed with.

Seen in the longitudinal direction of the vehicle, the transverse element is arranged at the height of a transverse beam forming a loading edge for a trunk. If this cross member is subjected to force during a rear impact, intrusion, in particular tipping of the cross member into the interior, is prevented by the cross member which supports the cross member. In a preferred design of the chassis, it is intended that the cross member and the cross member arranged in the area of the loading edge are connected to each other.

Further advantages and details of the invention result from the following description of a preferred embodiment example as well as from the Figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
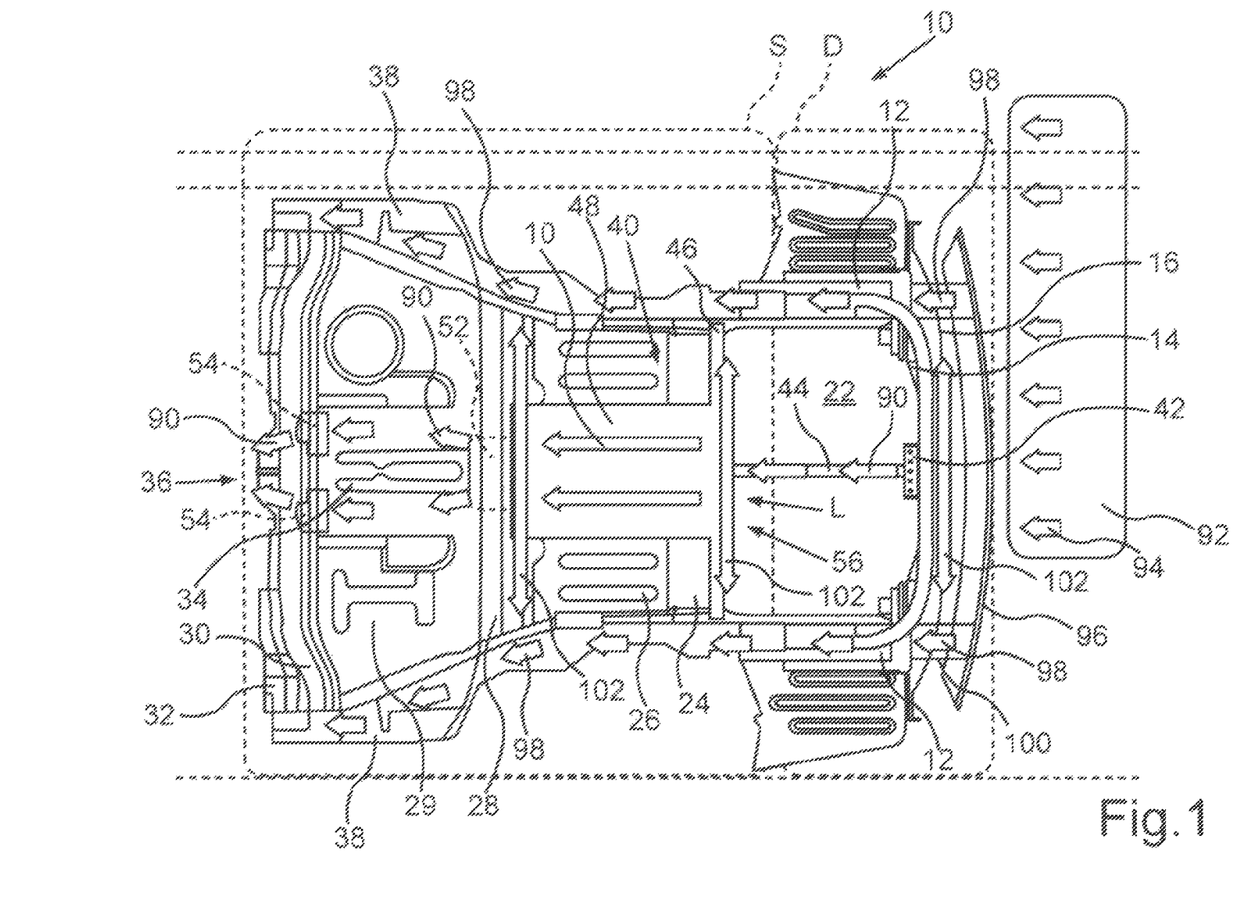
FIG. 1 is a top view, in sections, of a rear section of a design example of the inventive passenger car chassis, having a protective device according to the invention in a first embodiment which comprises a support arrangement with at least one outer support element arranged at the outer end of a rear deformation zone of the passenger car chassis, which is supported via a support structure forming an additional load path for support on at least one chassis structure part arranged in a protective zone of the passenger car chassis in the form of a central tunnel structure part, wherein the force profile is recognizable in the event of an accident-related application of force with a barrier.
Figure 2:
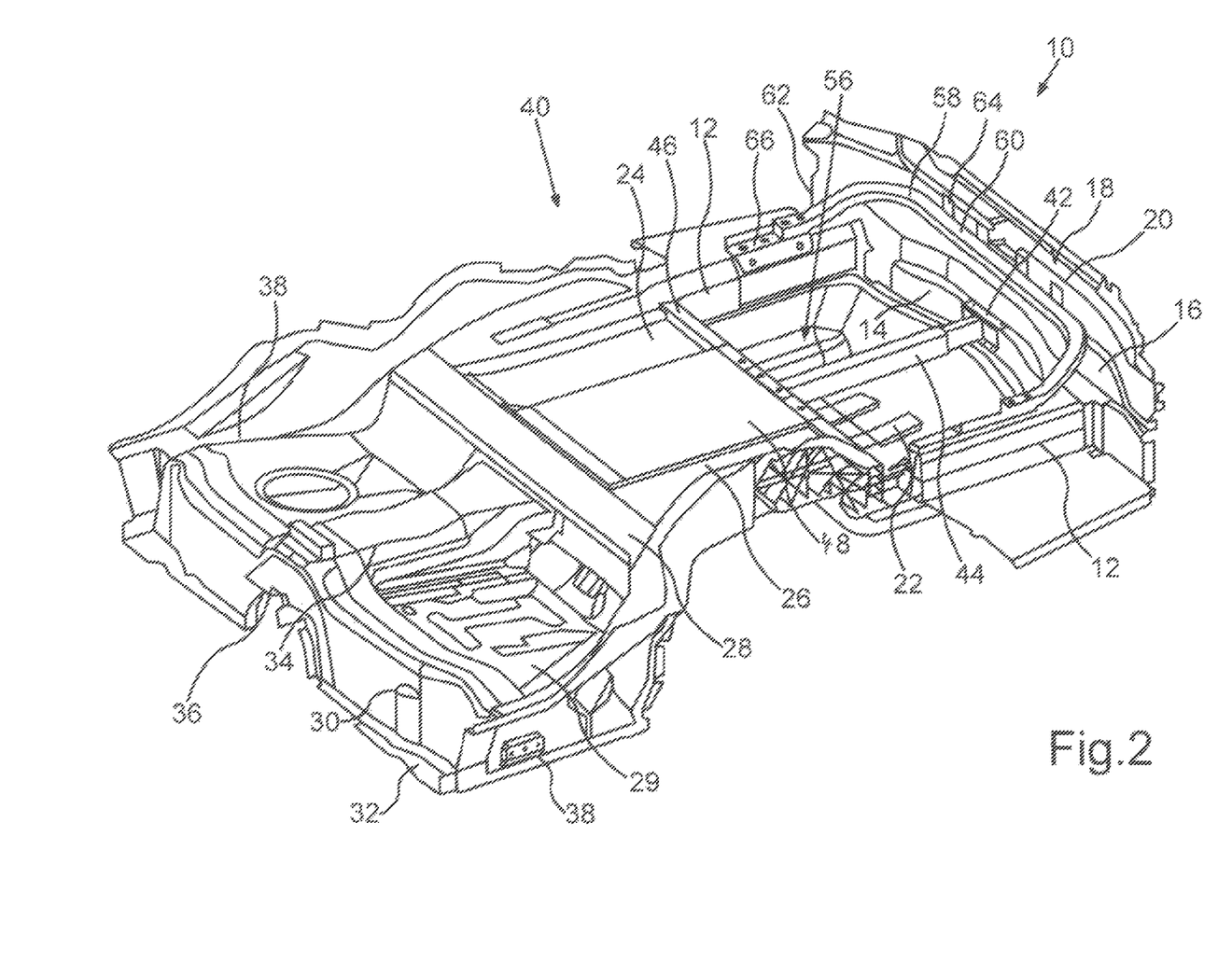
FIG. 2 is a sectional perspective view of the passenger car chassis in the rear area with the protective device as shown in FIG. 1.

FIGS. 1 and 2 show a sectional view of a rear section 10 of a passenger car chassis. As essential structural components of the passenger car chassis, two main longitudinal chassis beams 12, arranged laterally, are recognizable, which are connected to each other by a rear cross member 14 of a rear end wall 16. In the middle area, this end wall 16 ends at a cross member 20 forming a loading edge 18 for a luggage compartment.

Between the two main longitudinal chassis beams 12, a receiving space generally referred to as a spare wheel well 22 extends, which serves for example as accommodation space for—if provided—a spare wheel or alternatively for aggregates, cargo or the like. This spare wheel well 22 extends—seen in the forward direction of the motor vehicle—to the front up to a cross member 24, which connects the two main longitudinal chassis beams 12 with each other and limits the tail floor 26 to the rear. This rear tail floor 26 extends to the front up to a further cross member 28, which also connects the two main longitudinal chassis beams 12 with each other and limits a front rear bottom 29, which in the following is referred to as "rear bottom under rear seat", to the rear. The front rear bottom under rear seat 29 extends to the front up to a cross member 30, which in turn borders a no longer depicted main floor, which extends at least substantially to the height of the respective flanges 32, to the rear. A rear seat, for example, can be attached to the cross member 30.

The rare bottom under rear seat 29 is provided in its central area with a reinforcement 34 projecting upwards above its main plane, which is for example molded into the rare bottom under rear seat 29. This reinforcement extends from the cross member 28 in the center of the vehicle in the longitudinal direction of the vehicle to the front in the longitudinal direction of the vehicle up to a flange arrangement 36 in the region of the cross member 28, to which a center tunnel 35 formed on the main floor or provided thereon, only partially shown in FIG. 6 and running centrally in the vehicle, is attached and fastened. The essentially U-shaped or arched central tunnel 35, which is open at least in some areas downwards in the direction of the roadway, extends forwards as far as an unrecognizable front end wall and can be of one piece or of one piece throughout or can be composed of several structural parts of the central tunnel.

In an example of the chassis not depicted in the Figures, the middle floor is placed on the main floor and closed by it. This results in a closed, particularly stable and rigid hollow profile in the center area of the vehicle. The main floor, which is preferably closed in this way throughout, enables an aerodynamically improved air flow in the underbody area of the motor vehicle during driving operation.

The center tunnel 35 is connected to the vehicle floor and extends at least for the most part in the longitudinal direction of the vehicle (x-direction) in the area of a passenger compartment, also known as a passenger compartment. The center tunnel is therefore part of the self-supporting body-in-white and can be used, for example, to accommodate a cardan shaft, cooling water pipes or exhaust pipes.

The main floor is bounded by respective side sills 38, which merge into the rear main longitudinal chassis beams 12 in the area of the front rear bottom 29 or approximately at the height of the cross member 28. The rear main longitudinal chassis beams 12 therefore limit the wheel arches for the rear vehicle wheels, which are not shown, inwards in the area of the cross member 28 and the rear tail floor 26.

Figure 3:
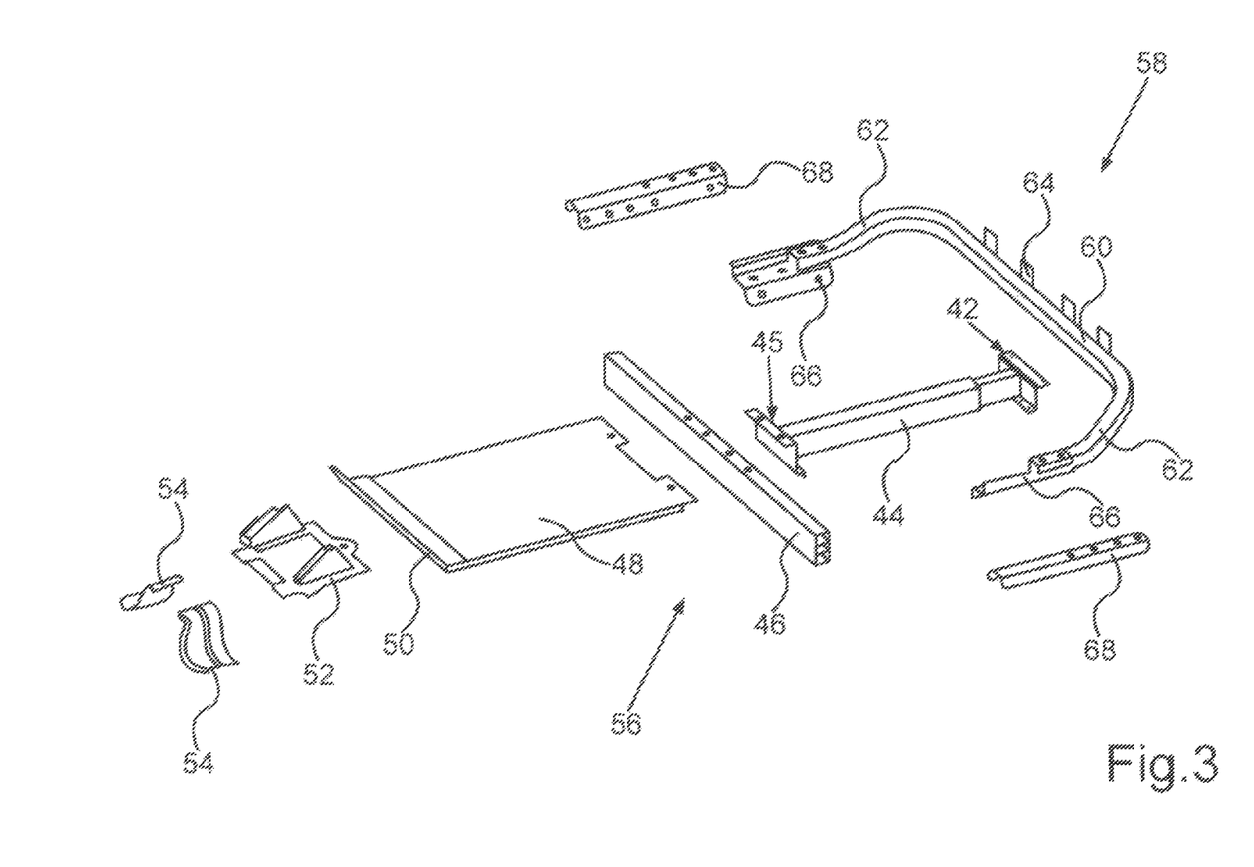
FIG. 3 is a perspective explosion representation of the essential components of the protective device according to FIGS. 1 and 2.

As can now be seen in particular in conjunction with FIG. 3, a protective device 40 is provided in the rear section 10 of the passenger car chassis, which in FIG. 3 shows its essential components in a perspective explosion diagram.

This protective device 40 initially comprises a rear, outer support element 42, which in the present case is designed as a contra-angle hand piece and which in the present case is arranged on the cross member 14 of the end wall 16. In the present case, this support element 42 is part of a support element running in the longitudinal direction of the vehicle in the form of a strut 44 which is connected to the front via a front inner support element 45 designed as an elbow with a cross strut 46. In this example the strut 44 is arranged centrally and is aligned with an axle which is arranged parallel to the longitudinal axis of the vehicle at height Y=0. Y=0 defines the center of the vehicle in the transverse direction of the vehicle (y-direction). A plate element 48 is connected to the front of this cross member 46, which—as can be seen from FIGS. 1 and 2—runs essentially along the entire length of the rear tail floor 26. The width of the plate element 48 measured in the transverse direction of the vehicle is clearly greater than the width of the strut 44, but a little less than the distance between the longitudinal chassis beams 12 at the height of the tail floor 26. The strut 44 is connected to the cross strut 46, for example detachable by means of screw connections or alternatively force-, shape- and/or material-locking, while the plate element 48 is in turn connected to the cross strut 46, preferably also by means of detachable connecting elements or alternatively force-, shape- and/or material-locking.

FIGS. 2 and 3 show that the cross member 46, which connects the cross member 44 with the plate element 48, runs at the rear end of the cross member 24. In order to create a gap- and step-free transition between these parts of the support arrangement, despite an aligned arrangement between strut 44 or its support element 45 and the plate element 48, which are located at approximately the same height in the vehicle vertical direction (z-direction), the plate element 48 has an open cutout at the edge in which the support element 45, which is adapted to it in shape and size, engages.

Figure 4:
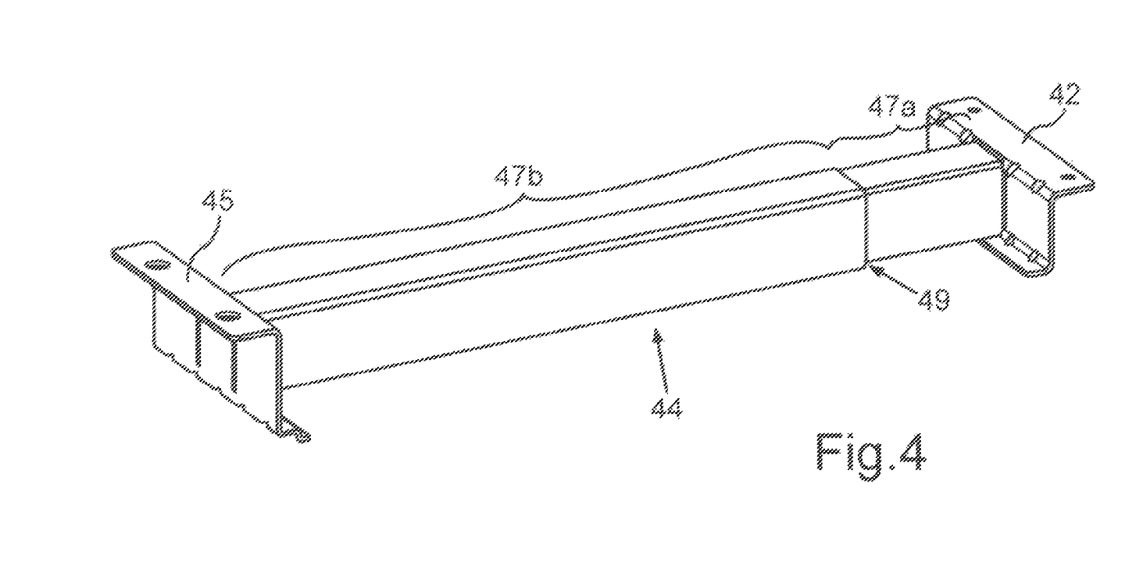
FIG. 4 is a perspective representation of an execution example of a central strut.

FIG. 4 shows a perspective representation of the central strut 44 with the support elements 42 and 45 arranged at the ends and designed as angle elements. It can be seen that the beam-shaped strut 44 has an elongated basic body with an essentially rectangular cross-section, which has a first longitudinal section 47a with reduced external dimensions in its end region close to the outer support element 42. The much longer remaining second longitudinal section 47b follows the first longitudinal section 47a and has larger dimensions than the first longitudinal section 47a. The first longitudinal section 47a is designed to form a deformable area which is intended to deform in a targeted energy-absorbing manner in the event of an impact of a collision partner, similar to known crash boxes, in order to reduce the loads acting on the vehicle occupants. The second longitudinal section 47b of strut 44, on the other hand, is designed as a rigid beam, which is intended to transmit the impact forces forward into the center tunnel in the desired manner, which will be discussed in more detail below.

It should be noted that plate element 48, analogous to the second longitudinal section 47b of strut 44, is also designed as a rigid beam or rigid surface element, which is intended to transmit the impact forces forward into the center tunnel in the desired manner and can also do so without endangering the structural integrity of the chassis in this area.

Figure 5:
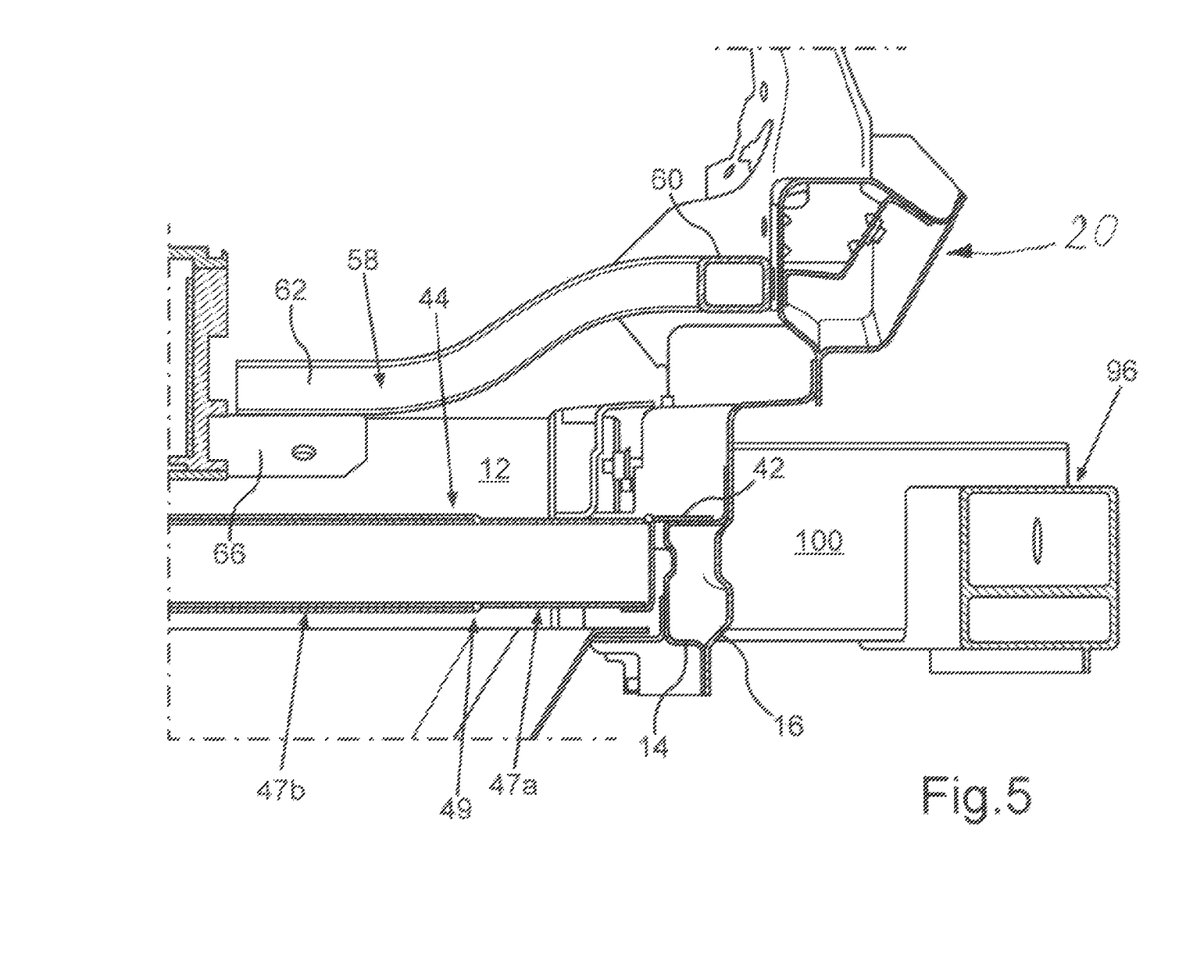
FIG. 5 is a sectional longitudinal section through the rear section of the vehicle as shown in FIGS. 1 and 2 at height Y=0, i.e., in the direction of the longitudinal center line of the passenger car.

FIG. 5, which shows a longitudinal section through the rear wagon area at height Y=0, i.e., along the vehicle's longitudinal axis, shows the structure of the central strut 44. This comprises two tubular hollow cylinders, each having a substantially rectangular cross-section, of which the hollow cylinder forming the longitudinal section 47a is inserted into the larger-diameter hollow cylinder forming the longitudinal section 47b, wherein in the region of the longitudinal section 47*b* practically a double wall with the associated reinforcing effect is formed. In this design example, the two hollow cylinders are connected to each other in their transition area 49, for example welded. The hollow cylinders can be of the same material and/or wall thickness. It is only important that these are designed and connected in such a way that the differently stiff longitudinal sections 47*a*, 47*b* are formed in the desired manner. It can also be seen that the ends of these longitudinal sections 47*a*, 47*b* are attached to the support elements 42 and 45 and fastened to them, e.g., welded on.

The plate element 48 is supported at the front by a flange 50 on the cross member 28. The plate element 48 is also connected to a force introduction element 52, which—as can be seen in particular from FIG. 1—bridges the cross member 28 and connects the plate element 48 to the rear bottom under rear seat 29. In addition, the supporting device comprises respective further force introduction elements 54, which—as can be seen from FIG. 1—connect the rear bottom under rear seat 29 with the cross member 30 or support it on this. In addition, these force transmission elements 54 ensure that the respective forces are transmitted to the undetectable front central tunnel structural part, which is located in the area of the likewise undetectable main floor in front of the cross member 30.

Overall, it can thus be seen that the strut 44, the cross strut 46, the plate element 48 and the force introduction elements 52, 54 form a support arrangement 56, via which in the present case the structural element arranged on the outer side of the passenger car chassis in the form of the cross member 14 is supported forwards, forming an additional, central load path L, at the level of the rear longitudinal chassis beams 12.

In addition to the present protective device 40, a U-shaped support element 58 is also provided, which comprises a transverse element 60 running in the region of the rear structural element in the form of the cross member 14 and above the same, and respective branches 62 running in the region of the corresponding main longitudinal chassis beams 12. The support element 58 is attached to the cross member 20 via respective lugs 64 and additionally supported over the entire length. The branches 62 are connected to the respective longitudinal chassis beam 12 via the respective angle elements 66 as well as the corresponding strip elements 68.

Figure 6:
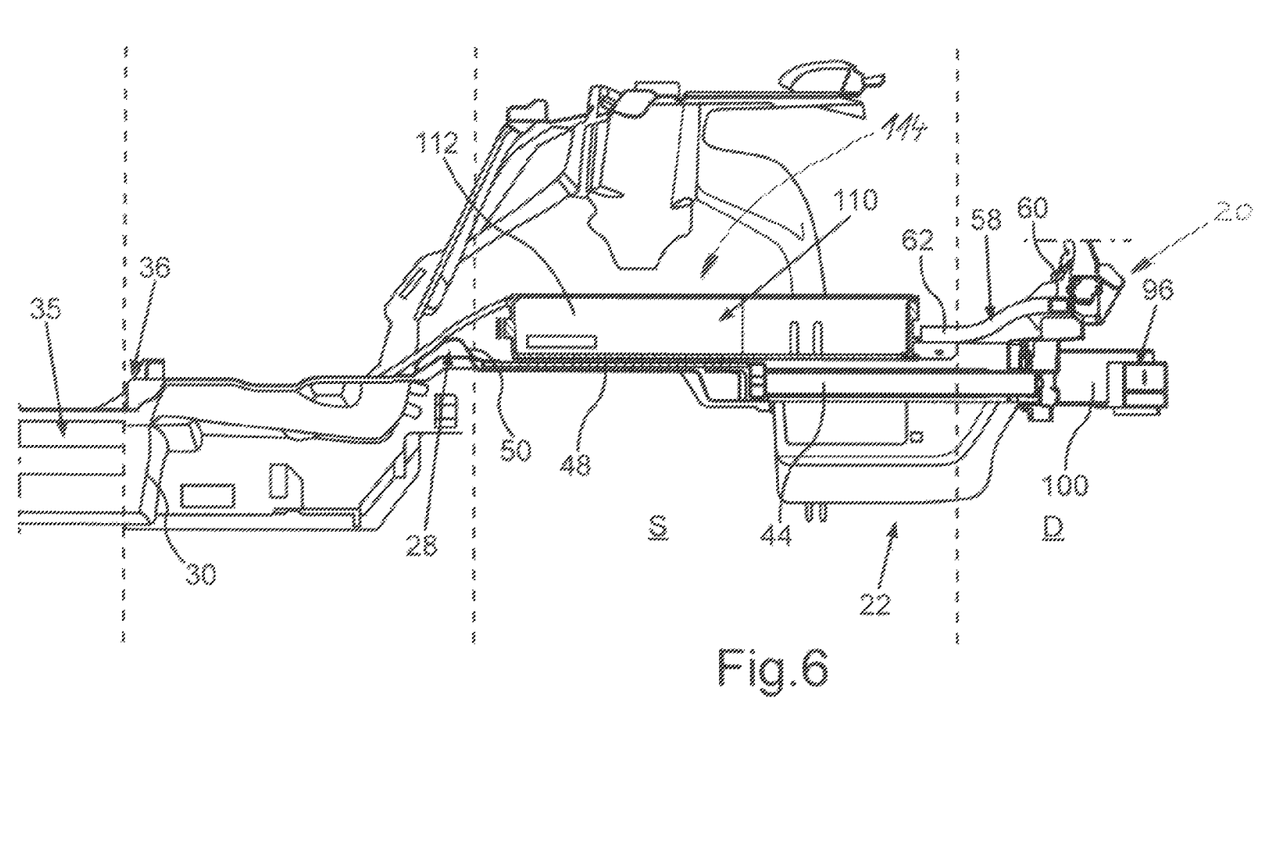
FIG. 6 is a cut-out, enlarged in comparison with FIG. 5, through the rear wagon region in accordance with FIGS. 1 and 2 to height Y=0, having an energy storage arrangement arranged above the central strut for supplying a drive unit.

As can be seen in particular from FIGS. 3, 5 and 6, the branches 62 of the support element 58 each have a crank such that, when the support element 58 is mounted on the chassis, its transverse element 60 is arranged at a vertical distance above the cross member 14, in the design example shown in the Figures, in the case of the support element 58 its transverse element 60 is arranged above the cross member 14, while the two branches 62 are placed from above on the respective longitudinal chassis beam 12 and fixed therein. This offset construction of the U-shaped support element 58 makes it possible to arrange the transverse element 60 in the vehicle vertical direction (z-direction) approximately at the level of an energy storage device 110 shown in FIG. 6, which can, for example, be designed as a high-voltage battery 112. The high-voltage battery 112 designed here as a cuboid block is completely arranged in the protection zone S indicated in FIG. 6, namely in an installation space area 114, which is provided above the load path L realized or realizable by means of the protective device 40. The high-voltage battery 112 is thus located above the strut 44 and the plate element 48, so that in the event of a rear-end collision, the accident forces are transmitted via the load path L below the high-voltage battery 112 into the central tunnel. Damage to the high-voltage battery 112 can thus be safely avoided, as the protective device 40 virtually bridges the installation space area 114 accommodating the high-voltage battery 112 with regard to deformations. Additional protection is also provided by the particularly stiff and rigid, bow-shaped support element 58, whose transverse element 60—viewed in the longitudinal direction of the vehicle—is arranged at the same height and in alignment with the high-voltage battery 112 and thus resists deformation of the rear car and/or penetration of a part of the impact partner caused by an impact, thus protecting the high-voltage battery 112 from damage. The possible impact forces acting on the transverse element 60 are also transmitted through the branches 62 into the main longitudinal chassis beams 12.

As can further be seen from FIG. 1, the structural element of the passenger car chassis, which is arranged in the region of a deformation zone D, which is further described in more detail below, is supported in the form of the cross member 14 with the aid of the support arrangement 56, forming the additional load path L, on respective structural chassis parts arranged in the region of a protective zone S of the passenger car chassis, in particular the center tunnel structural parts 34 or cross members 24 and 28 and longitudinal chassis beams 12 in the region of a protective zone S. The structural element of the passenger car chassis, which is arranged in the region of a deformation zone D, is also supported in the form of the cross member 14 with the aid of the support arrangement 56, forming the additional load path L. A load path, indicated by arrows 90, is formed by the support arrangement 56 in the middle of the vehicle and in the longitudinal direction of the vehicle between the two load paths formed by the longitudinal chassis beam 12, when the rear section 10—as indicated in the present case—is acted upon by a barrier 92 with corresponding accident forces 94. These accident forces 94 are first introduced into the respective longitudinal chassis beam 12 when the barrier 92 hits via a rear bumper cross member 96, which is part of a bumper arrangement, as shown by the arrows 98. The bumper cross member 96, for example, is supported by energy absorption elements 100 at the rear ends of the respective main longitudinal chassis beam 12.

The preferred embodiment of the chassis is such that only after the energy absorption elements 100, also referred to as crash boxes, have been deformed on a block, i.e., can no longer be deformed in an energy-absorbing manner in the longitudinal direction of the vehicle, and the bumper cross member 96 has also been deformed accordingly, is the load path L additionally formed in the further course of the accident scenario when the support arrangement 56 is subjected to accident forces. The support arrangement 56 ensures, on the one hand, load distribution in accordance with the arrows 102 in the direction of the outside of the vehicle or in the direction of the respective main longitudinal chassis beams 12, and, on the other hand, distribution of the forces under formation of the load path L in accordance with the arrows 90 in the longitudinal direction forwards to the respective structural components in the protection zone S, in particular to the respective central tunnel structural components 34, of which the rear central tunnel structural component 34 is recognizable. This is then used to transfer the force into the unrecognizable front central tunnel structural part, which runs forward in the area of the main floor. The forces introduced into the longitudinal chassis beams 12 according to the arrows 98 are transmitted to the front via the side skirts 38.

The protective device 40 thus opens up an additional load path L between the rear bumper cross member 96 and the center tunnel 35, which can only be seen in sections in FIG.

6, wherein this load path L extends between the respective main longitudinal chassis beams 12 and side sills 36. This results in a significant reduction of the forces on the main longitudinal chassis beams 12 and a resulting relief, which preserves the structural integrity in the rear wagon area 10 and results in a targeted deformation in the main deformation area, i.e., deformation zone D. The load path L is the same as the load path L between the main longitudinal chassis beams 12 and side sills 36. This significantly reduces the load in an installation space where the high-voltage battery is usually located, so that the risk of excessive deformation of the chassis and damage to corresponding components in this installation space area of the passenger car chassis is significantly reduced. The respective batteries or similar components can, for example, be located in the area of protection zone S or also in the area of deformation zone D, at least in a front area of deformation zone D.

The protective device 40 can easily be mounted on a passenger car chassis already formed as a corner type. This results in a low corner type load in terms of cost and weight and a simple assembly solution.

In a design example not shown in the Figures, in contrast to the protective device 40 described above, the cross member 46 is not connected to the main longitudinal chassis beams 12, so that no load path to the main longitudinal chassis beams 12 is built up via this cross member 46. In this case, the cross member 46 serves as a load distributor for the forces transmitted via the member 44 aligned in the longitudinal direction of the vehicle to the plate element 48.

Irrespective of whether the cross member 46 is attached to the main longitudinal chassis beams 12 or not, at least one longitudinal chassis beam or several longitudinal chassis beams arranged at a distance from one another in the transverse direction of the motor vehicle may be provided instead of the flat plate element 48 in order to transmit the forces transmitted via the cross member 46 forwards into the cross member 28.

The invention claimed is:

1. A chassis for a passenger car, comprising:
   two main longitudinal chassis beams which extend as far as a rear region of the passenger car and are connected to one another via a bumper cross member; and
   a support arrangement which extends between the two main longitudinal chassis beams and which is supported on a central tunnel disposed in a protective zone of the chassis, wherein the support arrangement forms a load path in an event of a collision-related force being applied to the passenger car, wherein above and/or below the support arrangement an installation space region is provided for accommodating a component or unit in need of protection, and wherein the support arrangement includes a strut which extends in a region of a center of the passenger car between the two main longitudinal chassis beams and which forms a protective device which transmits impact forces forwards to the central tunnel in the event of the collision-related force being applied to the passenger car;
   wherein the strut has a first longitudinal section that is deformable in a targeted energy-absorbing manner in the event of the collision-related force being applied to the passenger car and a second longitudinal section which functions as a rigid beam,
   wherein the installation space region is provided separately from a passenger seat area of the passenger car, and
   wherein the component or unit in need of protection is integrated with the passenger car.

2. The chassis as claimed in claim 1, wherein at least the first longitudinal section of the strut is disposed in a region of a deformation zone.

3. The chassis as claimed in claim 1, wherein the support arrangement includes, in a region of the protection zone, a plate element and/or a second strut which is of rigid and stiff design such that it withstands the collision-related force and passes the collision-related force on to the central tunnel.

4. The chassis as claimed in claim 1, wherein the support arrangement includes force application introduction elements via which the collision-related force is introducible into a rear floor into a cross member and/or the central tunnel.

5. A chassis for a passenger car, comprising:
   two main longitudinal chassis beams which extend as far as a rear region of the passenger car and are connected to one another via a bumper cross member;
   a support arrangement which extends between the two main longitudinal chassis beams and which is supported on a central tunnel disposed in a protective zone of the chassis, wherein the support arrangement forms a load path in an event of a collision-related force being applied to the passenger car, wherein above and/or below the support arrangement an installation space region is provided for accommodating a component or unit in need of protection, and wherein the support arrangement includes a strut which extends in a region of a center of the passenger car between the two main longitudinal chassis beams and which forms a protective device which transmits impact forces forwards to the central tunnel in the event of the collision-related force being applied to the passenger car; and
   a U-shaped support element which extends in a region of a rear structural element at an outer end of a deformation zone and in a region of the two main longitudinal chassis beams, wherein as viewed in a longitudinal direction of the passenger car, the U-shaped support element is disposed at least in sections in overlap with the installation space region arranged above the load path,
   wherein the installation space region is provided separately from a passenger seat area of the passenger car, and
   wherein the component or unit in need of protection is integrated with the passenger car.

6. The chassis according to claim 5, wherein the U-shaped support element has a transverse element arranged at a height of, and in overlap with, the installation space region and has branches running in a region of the two main longitudinal chassis beams and connected to a respective one of the two main longitudinal chassis beams.

7. The chassis according to claim 6, wherein the transverse element, when viewed in the longitudinal direction of the passenger car, is disposed at a level of a transverse beam forming a loading edge for a boot.

* * * * *